May 19, 1953 R. M. BARTH 2,639,213
MOLD PARTING SURFACE AND METHOD OF APPLICATION
Filed March 21, 1950
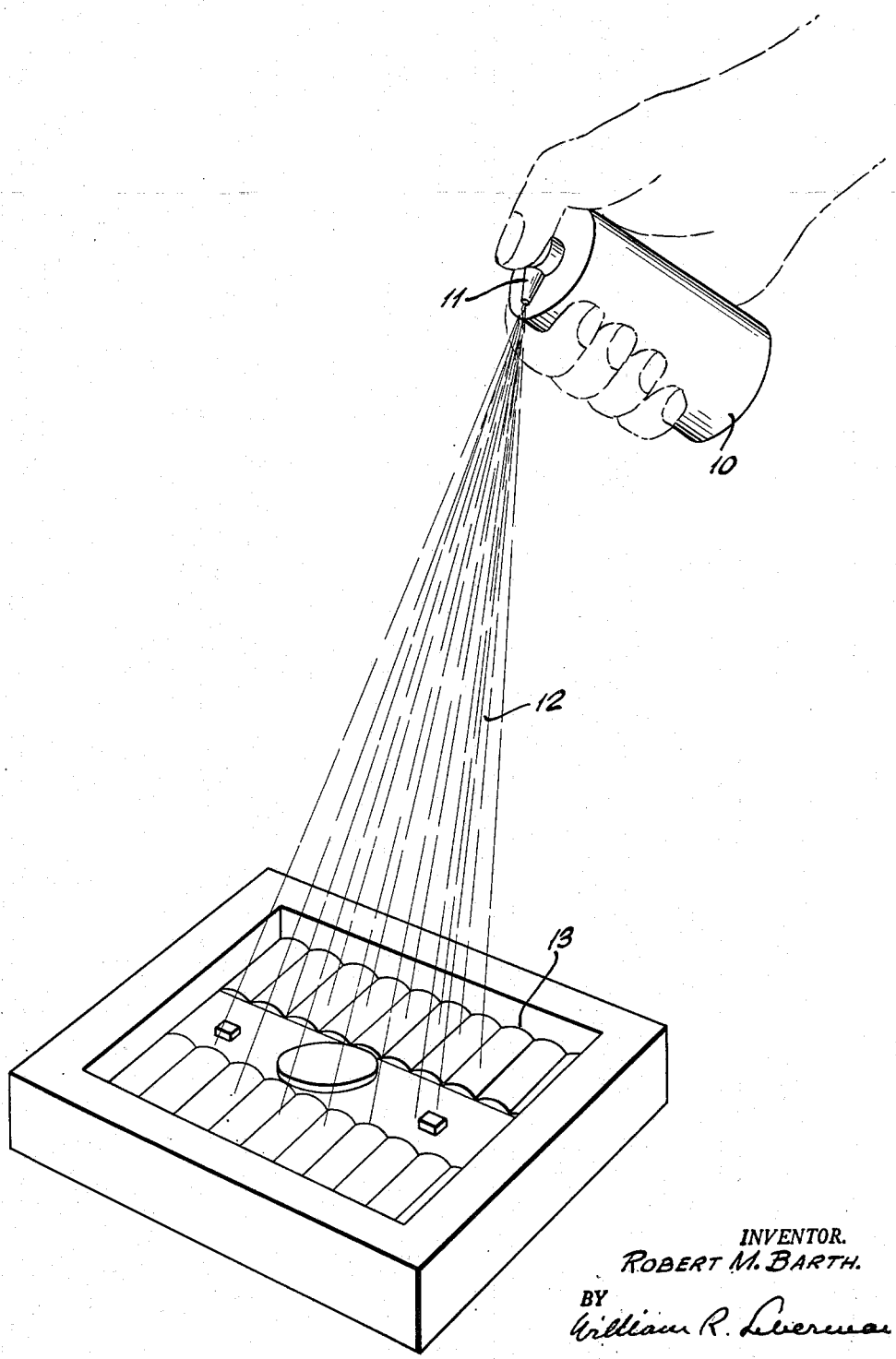
INVENTOR.
ROBERT M. BARTH.
BY
ATTORNEY Patented May 19, 1953

2,639,213

UNITED STATES PATENT OFFICE 2,639,213

MOLD PARTING SURFACE AND METHOD OF APPLICATION

Robert Menning Barth, Pelham Manor, N. Y., assignor to Price-Driscoll Corporation, New York, N. Y., a corporation of New York Application March 21, 1950, Serial No. 151,041

6 Claims. (Cl. 18—47)

The present invention relates to an improved method and composition employed in the field of casting and molding and it relates more particularly to an improved method and composition for treating the working surfaces of molds or dies to permit and facilitate the release of the cast or molded object from the die or mold.

In the casting or molding of materials, and more particularly in the casting and molding of organic plastic materials, it is generally necessary to treat the surface of the mold or die periodically in order to prevent the sticking of the cast or molded object to the surface of the mold or die and thereby permit the ready removal of the cast or molded object as a whole without damaging the object or the mold or die surface. This treatment is of necessity performed very often, either for each casting or molding operation, or at most for every several operations, depending upon the casting or molding conditions and upon the treatment. Such treatment consists in applying a coating or thin film of a mold release or parting agent to the working surface of the mold. This mold release or parting agent is a substance which can be applied as a thin coating and which adheres to the mold surface and not to the cast or molded object or at least preferentially adheres to the mold surface. As a result of this preferential adherence of the parting agent, a highly effective parting surface is formed and the cast or molded object can be easily removed from the mold. Examples of parting compounds which are employed are mineral oils, glycerin, metallic soaps such as zinc stearate, silicone base oils, etc. Recently, the silicone base oils have become widely employed and preferred as parting agents due to their ability to being employed for many casting operations or cycles without removal of the parting layer, their incompatibility with most organic plastics, the freedom of discoloration by silicone base oil cast organic plastics, and because of many other inherent characteristics which are highly desirable in parting agents.

Heretofore, the mold release compound or parting agent has been applied to the mold surface by brushing thereof or by spraying thereof with a point-type spray gun. The parting agent was usually dispersed or dissolved in a volatile diluent and applied as such to the working surface of the mold. This procedure has numerous disadvantages which make its use costly, hazardous and unsatisfactory.

In applying the parting agent under known procedures, as aforesaid, it is very difficult, if not impossible, to obtain a uniform thin coating or film of the parting agent on the mold surface, the parting surface being usually marred with drip or brush marks and lines, craters, fine openings or valleys in the mold surface are filled or clogged, etc. As a result many fine details on the mold are lost in the casting or molding, and undesired surface impressions are imparted to the casting, thus making precision work and true casting practically impossible. Furthermore, the application of the parting surface is highly time consuming, particularly where a volatile solvent is used and must be evaporated before the mold is employed. This reduces the effective capacity of the casting and molding equipment. Moreover, the solvents employed are either toxic or inflammable thereby presenting a health or fire hazard.

It is, therefore, a principal object to provide an improved method and composition for applying a parting surface to the working surface of a mold or die.

Another object of the present invention to to provide an improved method and composition for applying a parting surface to the working surface of a mold which parting surface closely follows the surface of the mold and does not obliterate or mar any of the fine details of the mold working surface, thereby enabling the production of true and precision castings.

A further object of the present invention is to provide an improved method and composition for applying a parting surface to the working surface of a mold which application consumes a minimum of time, thereby reducing the periods during which the casting or molding machine is inoperative.

Still a further object of the present invention is to provide an improved method and composition for applying a parting agent to the working surface of a mold which is characterized by economy of time consumption, absence of health or fire hazards and the desirability of the resulting fine parting surface.

The above and further objects of the present invention will become apparent from a reading of the following description in conjunction with the accompanying drawing which illustrates a preferred embodiment of the present invention.

The present invention broadly contemplates the application of a mold release compound or parting agent to the working surface of a mold by exposing said working surface to a fine mist or spray of the parting agent whereby said mist or spray deposits as a uniform film of the undiluted parting agent upon the surface of the mold, the average size of the particles forming said mist or spray preferably not exceeding 50 microns. This mist or spray of undiluted particles of parting agent preferably not exceeding 50 microns in average particle size may be accomplished in many ways. For example, the parting agent may be propelled by means of high pressures through a suitable nozzle which breaks up the parting agent into the fine mist or spray having an average particle size not exceeding 50 microns and the mold surface exposed to this mist or spray.

However, it has been highly desirable and convenient to disperse or dissolve the parting agent in a suitable liquified gas having the prerequisite minimum vapor pressure at room temperature. This dispersion or solution of the parting agent in the liquified gas is carried in a suitable pressure container 10 provided with a valved nozzle 11, as illustrated in the accompanying drawing. Upon opening the valve, the dispersion or solution of parting agent in the liquified gas or propellant is released through the nozzle 11, the liquified gas immediately or shortly thereafter evaporating leaving a mist or spray 12 of the parting agent with little or no diluent. If the mold surface 13 is in the path of this mist or spray, the parting agent will deposit thereon to form a thin uniform coating or parting surface.

The propellant or liquified gas should have a vapor pressure at 70° F., exceeding twenty pounds per square inch gauge and preferably between twenty-five and forty pounds per square inch gauge in order to produce a parting agent mist not exceeding fifty micron average particle size and permit the convenient handling of the resulting composition and container. Furthermore, the propellant should not have too low a boiling point at atmospheric pressure in order to facilitate the packaging of the parting agent and propellant mixture. Another important requisite is that the propellant be non-toxic and have a high flash point preferably being non-inflammable. There are many compounds which meet the above requirements for the satisfactory propellant for example the "Freons" and "Genetrons," that is dichlorodifluoromethane, chlorodifluoromethane, a fluoroethane.

While any satisfactory parting agent may be employed in the present composition and method, it has been found that the silicone base oils are unusually superior and effective. While silicone base oils having viscosities as low as 75 S. S. U. may be used, it is preferable to employ silicone base oils having viscosities of several thousand S. S. U. or more. It has been further found that a mixture of a silicone base oil and polybutene excels as a parting agent when employed in accordance with the present invention.

As a preferred embodiment of the present invention, a 4% solution of a silicone base oil having a viscosity of approximately 5000 S. S. U. in "Freon" is enclosed in a pressure vessel having a valved nozzle. The valve is opened for one or more seconds to produce a burst of propellant and parting agent which results in a fine floating mist of the parting agent having an average particle size not exceeding approximately 50 microns. The propellant evaporates almost immediately after leaving the vessel leaving the aforesaid mist of almost undiluted parting agent. The surface of the mold is exposed to this mist which deposits on the surface to form an exceedingly thin uniform film of parting agent on the mold surface which follows almost exactly all the details and contours of the mold.

The present invention, as hereinabove described and illustrated, accomplishes all the objects of this invention as earlier set forth. While there has been described and illustrated preferred embodiments of the present invention, it is obvious that numerous omissions and alterations may be made without departing from the spirit thereof.

Having described my invention, what I claim and desire to secure by Letters Patent is:

1. A composition for the application of a parting surface to the face of a mold comprising a liquified gas selected from the group consisting of dichlorodifluoroethane, chlorodifluoromethane and fluoroethane and a silicone base oil dissolved therein, said silicone base oil having a viscosity in excess of 5000 S. S. U.

2. A composition for the application of a parting surface to the face of a mold comprising a liquified gas selected from the group consisting of dichlorodifluoroethane, chlorodifluoromethane and fluoroethane, a silicone base oil having a viscosity in excess of 5000 S. S. U. and polybutene.

3. A composition for the application of a parting surface to the face of a mold comprising a liquified gas selected from the group consisting of dichlorodifluoroethane, chlorodifluoromethane and fluoroethane, and a silicone base oil dissolved therein and having a viscosity in excess of 5000 S. S. U., said silicone base oil comprising approximately 4% of said composition.

4. The method of applying a parting surface to the face of a mold comprising the steps of producing a spray of a parting agent including a silicone base oil having a viscosity in excess of 75 S. S. U., said parting agent being dissolved in a liquified gas solvent having a vapor pressure in excess of twenty pounds per square inch gauge at 70° F., permitting said solvent to evaporate while in sprayed condition to leave a fine suspended mist of said parting agent in a substantially undiluted state and exposing said mold to said mist whereby the particles forming said mist deposit upon the surface of said mold to form a coating of said parting agent.

5. The method as claimed in claim 4, wherein said liquified gas solvent is selected from the group consisting of dichlorodifluoroethane, chlorodifluoromethane and fluoroethane.

6. The method as claimed in claim 4, wherein said silicone base oil has a viscosity in excess of 5000 S. S. U. and the relative proportions of said parting agent and said solvent are such as to result in a mist of said parting agent having an average particle size not exceeding 50 microns.

ROBERT MENNING BARTH.

References Cited in the file of this patent

UNITED STATES PATENTS

| Number | Name | Date |
|---|---|---|
| 2,256,603 | Wright | Sept. 23, 1941 |
| 2,437,606 | Kaufman | Mar. 9, 1948 |
| 2,449,114 | Gebauer | Sept. 14, 1948 |
| 2,456,853 | Arbron | Dec. 21, 1948 |
| 2,470,593 | Webb et al. | May 17, 1949 |

OTHER REFERENCES

"Rubber Age," January 1947, page 485, column 2, Dow Corning Corporation Advertisement.

"Esso Oilways," July 1949, pages 1–8, "Miracles from the Sands of Time."